United States Patent [19]

Henze et al.

[11] Patent Number: 4,796,136
[45] Date of Patent: Jan. 3, 1989

[54] DISC DRIVE COMPATIBLE CARTRIDGE TAPE

[75] Inventors: Richard H. Henze, Redwood City, Calif.; Charles H. McConica, Windsor, Colo.; George Clifford, Los Altos Hills; Bruce F. Spenner, Los Gatos, both of Calif.

[73] Assignee: Hewlett-Packard Company, Palo Alto, Calif.

[21] Appl. No.: 713,162

[22] Filed: Mar. 18, 1985

[51] Int. Cl.⁴ .................. G11B 5/78; G11B 17/04; G11B 25/10
[52] U.S. Cl. ............................ 360/132; 360/137; 242/197
[58] Field of Search ............... 360/96.4, 96.5, 96.6, 360/132, 94, 137; 242/197-199

[56] References Cited

U.S. PATENT DOCUMENTS

| 4,498,112 | 2/1985 | Georgens et al. | 360/132 X |
| 4,511,940 | 4/1985 | Yamaguchi et al. | 360/96.6 |
| 4,514,775 | 4/1985 | Manning et al. | 360/106 X |

Primary Examiner—Stuart N. Hecker
Assistant Examiner—Alyssa H. Bowler
Attorney, Agent, or Firm—John A. Frazzini

[57] ABSTRACT

A tape cartridge adapted to utilize the read/write head(s) in a disc drive to read data from and/or write data to the tape. The tape cartridge has a section A having a size and shape which enables it to be inserted into the disc drive to locate a portion of the tape at a location L suitable for transferring data with the disc drive head(s). The tape cartridge includes: tape media; a means to register the tape media with respect to the read/write head(s) of a disc drive; a means for storing that portion of the tape media which is not contained within section A; and a means for feeding the tape media past the read/write head(s) in the disc drive. The tape cartridge may include a linkage that enables it to utilize the disc drive spindle motor to feed the tape. The linkage can also include a clutch to enable tape feed direction to be reversed.

14 Claims, 8 Drawing Sheets

FIG 3

DISC DRIVE COMPATIBLE CARTRIDGE TAPE

BACKGROUND OF THE INVENTION

This invention relates in general to data storage media and more particularly to a data tape apparatus that utilizes the read/write head(s) of a disc drive to read and/or write on the tape. Tape storage media are widely used to store large amounts of data that do not need to be rapidly accessed by a computer. Tape media are often used for archival storage and to store a duplicate copy of data in case the original data located in a computer is inadvertently erased or damaged. This second function is referred to as "backup" storage.

Normally, to store data on tape requires an apparatus specifically designed to record data on tape. The added expense of acquiring such a tape storage apparatus to back up online or disc based memory is easily justified in large data processing systems, but for small systems the additional expense can be a significant percentage of the total system cost. In the case of personal computers, the cost of the tape storage unit is on the order of the cost of the personal computer. Therefore, personal computer users generally utilize inexpensive floppy discs for both backup storage and removable data storage. Backup storage can be effected by copying the original data onto floppy discs. Hard discs having capacities between 20 and 80 times the capacity of floppy discs are becoming increasingly utilized by personal computer users. Because it can be quite time consuming to copy data from a hard disc onto a set of floppy discs, it is advantageous to have a tape storage unit that is inexpensive relative to the cost of personal computers for large capacity, removable data storage. Such a device can be used for backup of online storage, distribution of software or databases, or as a low cost, slow access type of online storage.

SUMMARY OF THE INVENTION

A tape storage unit is presented that utilizes the read/write head(s) of a disc drive to write data and/or to read data from a tape. This tape storage unit, referred to herein as the tape cartridge, contains a tape media for data storage, a mechanism to register the tape with respect to a location L at which data is written to the tape or is read from the tape by the read/write head(s) of the disc drive, a mechanism for storing the tape media, and a mechanism to feed the tape past the read/write head(s). A part of the tape cartridge referred to as Section A in FIGS. 2–4 has an external shape and size which allows that portion to be inserted into the disc drive to enable the tape to be placed in the vicinity of the read/write head(s). For most disc drives, Section A has a disclike shape.

The tape media can be any media which is compatible with the read/write scheme of the disc drive with which the tape cartridge is to be utilized. Present generation floppy disc drives would require a magnetic tape with magnetic properties suitable for operation with the disc drive's magnetic read/write head(s). These tapes can include a backing layer to increase wear resistance, to reduce friction, and/or to reduce static electric charge. For disc drives utilizing other schemes of recording materials such as magneto-optic media or optical discs, the tape should include a compatible type of recording material.

The mechanism to register the tape with respect to the read/write head(s) of the disc drive consists of two components: a mechanism to guide the tape and/or change the direction of the tape travel; and a mechanism to align such guide mechanism with respect to some valid reference frame in the disc drive. This alignment mechanism assures that the tape is accurately positioned with respect to the read/write head(s) and is travelling along the correct path as it passes near the read/write head(s).

The tape media can be stored in a variety of ways, including: two spools which alternately wind and rewind a length of tape; an endless loop configuration which stores the tape around a spool or a series of spools; a compartment of packed tape (endless loop or reversing length); or a simple continuous band of tape.

For embodiments that do not contain an endless loop of tape, read/write operations are either all in one direction, or in alternating directions depending upon the capabilities of the disc drive head(s). When the tape cartridge is used with a disc drive that will transfer data in either direction of tape travel, half of the tracks will be recorded in one direction and the other half will be recorded in the other direction, thereby eliminating the need to rewind the tape between data transfer on successive tracks. In disc drives that can only transfer data in one direction, the tape is rewound at the end of each track, the read/write head(s) are translated lateral to the tape feed direction to locate the head over the next track to be read or recorded, and then the data transfer process is continued.

There are many well known mechanisms for feeding tape. These mechanisms typically include a motor, a drive element in direct contact with the tape, and a linkage between this element and th motor. Suitable drive elements include a takeup spool that is winding up the tape, a capstan, a capstan/pressure wheel combination, or a contact belt. The motor can be included in the tape cartridge or can be external to it. In some embodiments the disc drive spindle motor is utilized to move the tape past the read/write head(s).

The main limitation on the choice of linkage is its size. This is particularly true when the disc drive spindle motor is utilized to move the tape, because the size of the tape cartridge section which is inserted into the disc drive is constrained by the disc drive. The linkage should also be efficient and steady in transmitting power because of the fairly low power of typical disc drive spindle motors and because of the need to minimize perturbations in tape velocity and edge location as the tape moves past the read/write head(s). Some choices of a linkage include various types of belts, gears, worm gears, friction wheels, eccentric and link combinations, flexible cables, rigid shafts, or some combination of these or other means. When the motor can rotate in only one direction, and two spools are used for storing the tape media, the linkage can also include a clutching mechanism to reverse the direction of tape motion.

For cartridges requiring reversal of tape direction, commands to reverse direction can be transmitted to the tape cartridge via the disc drive spindle, head actuator, or head loading motors. Since the tape cartridge can include a battery or can be electrically connected to the disc drive or some other source of electrical power, embodiments of the transmission and clutch can have electrical components as well as mechanical components. Likewise, the motion of the tape can be effected by an electrical motor that is part of the tape cartridge, powered by a battery or by an external electrical connection. For disc drives which are designed to accomodate tape cartridges, the disc drive can contain electrical contacts to provide electrical power and/or control information to the tape cartridge. Tape and disc drive devices typically have some feedback loops to adjust for variation in the speed of the media. Such feedback can adjust the speed of the media or can adjust the rate of reading and writing—the feedback need only maintain the ratio between media speed and read/write rate at a substantially constant value. For example, in many disc drives, the disc drive controller adjusts the read rate in response to transitions on the disc. This disc drive controller will identically adjust the read rate in response to data transitions on the tape in the tape cartridge. Therefore, it is only necessary to ensure that the variations in the speed of the tape past the read/write head(s) are within the response limits of the disc drive controller's read/write rate feedback loop. To help assure this, parameters of the tape media, tape guidance system, and tape feeding system, can be selected to closely emulate the parameters of the associated disc.

The nature of the data stored on the tape is determined by the means with which the disc drive head(s) store data on a disc. If the read/write head(s) store data in a bit serial fashion, then data is stored on the tape in this way. Similar compatability between the means of data storage on a disc, and on the tape in the tape cartridge would exist whether this means was data storage in a parallel fashion, with signal amplitude modulation, or with signal frequency modulation. Any data encoding schemes that the disc drive system uses in storing data on a disc (for example, MFM data encoding which is sometimes used to encode digital data onto magnetic discs) would be identically implemented with data stored on the tape in the tape cartridge. Data formats, which describe how the data is organized on a disc or on the tape cartridge, include such parameters as number of data tracks, number of sectors per track, number of bytes per sector, sector header information, and extra coding for error detection. These parameters are set up by the disc drive's controller. A format for the tape, and other parameters which the disc drive controller uses, such as interleave factors, would not necessarily be identical to that of a disc. The primary difference is that the tape cartridge would need many more sectors per track and/or longer sectors to take advantage of the increased capacity of the tape media. Therefore, a means for temporarily changing these parameters in the disc drive controller when performing data storage with the tape cartridge is necessary for utilization of the increased capacity of the tape cartridge. These changes would be implemented either through software control via the host computer's operating system, or by changing a controller ROM which contains these parameters. The optimum means of doing this, and the specific parameters chosen, depends on the specific controller, operating system, and disc drive present.

DESCRIPTION OF THE PREFERRED EMBODIMENT

Several potential embodiments of the tape cartridge have been examined, and two will be presented in the following discussion. Both are intended for use with a standard 3.5 inch microfloppy disc drive. Embodiments with similar functional components could potentially be implemented for utilization with other size disc drives. The primary difference between the two embodiments is that the first includes a length of tape with two ends, while the second utilizes an endless loop of tape. These implementations affect how the tape is driven and stored in each case. They have little impact however, on the actual tape media used, and how it is registered with respect to the disc drive. Therefore, the discussion of the tape media and its registration will be common to both transport/storage embodiments.

Figure 2:
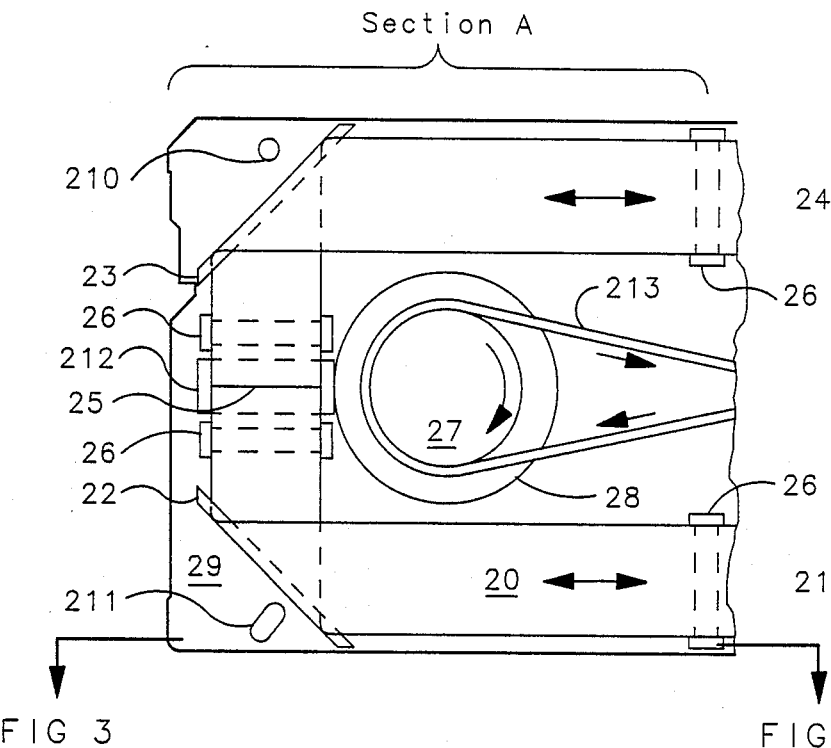
FIG. 2 is a top view with cover removed of the portion of the tape cartridge (denoted as Section A) which fits inside a 3.5 inch microfloppy disc drive and which contains a means for registering the tape with respect to the disc drive heads.
Figure 3:
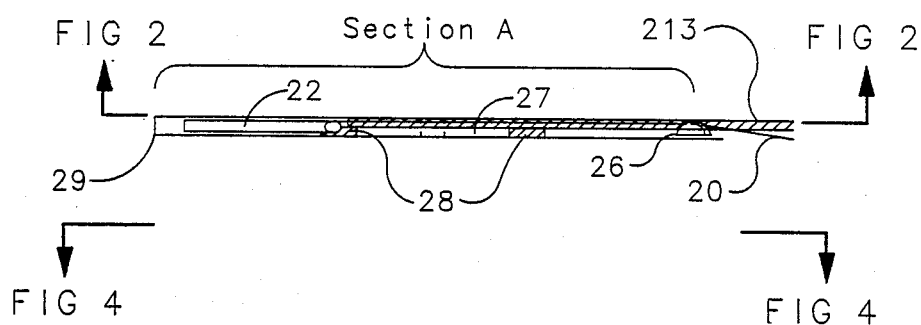
FIG. 3 is a side cross-sectional view of the embodiment shown in FIG. 2.
Figure 4:
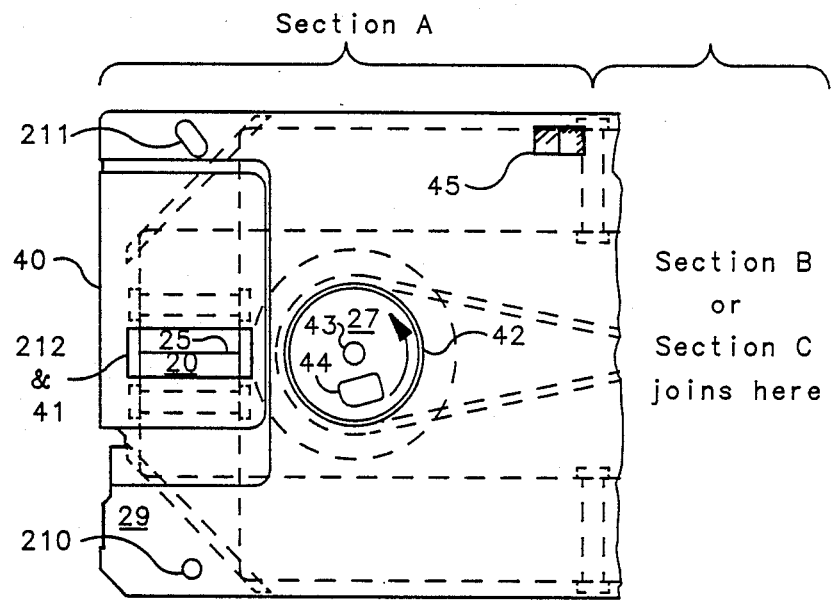
FIG. 4 is a bottom view of the embodiment shown in FIG. 2.
Figure 5:
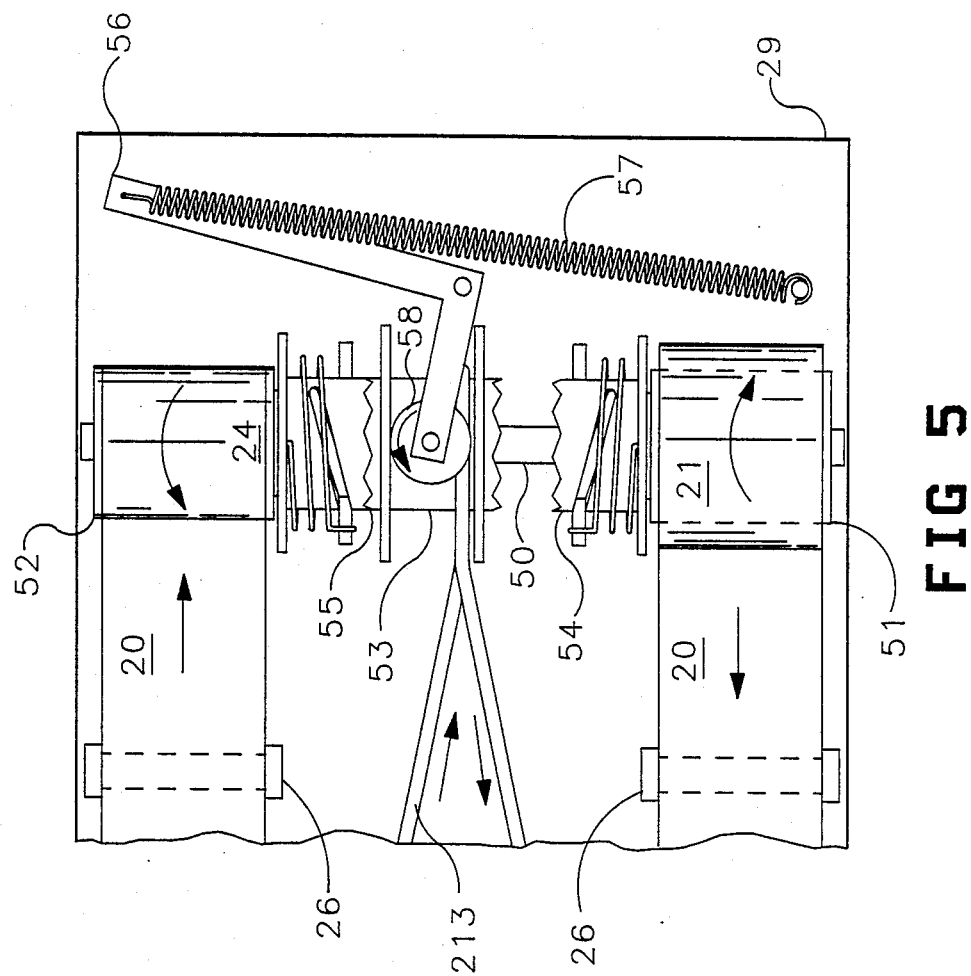
FIG. 5 is a top view with cover removed of one embodiment of the portion of the tape cartridge (denoted as Section B) for feeding and storing the tape media in the tape cartridge. This embodiment utilizes a length of tape with two ends.
Figure 8:
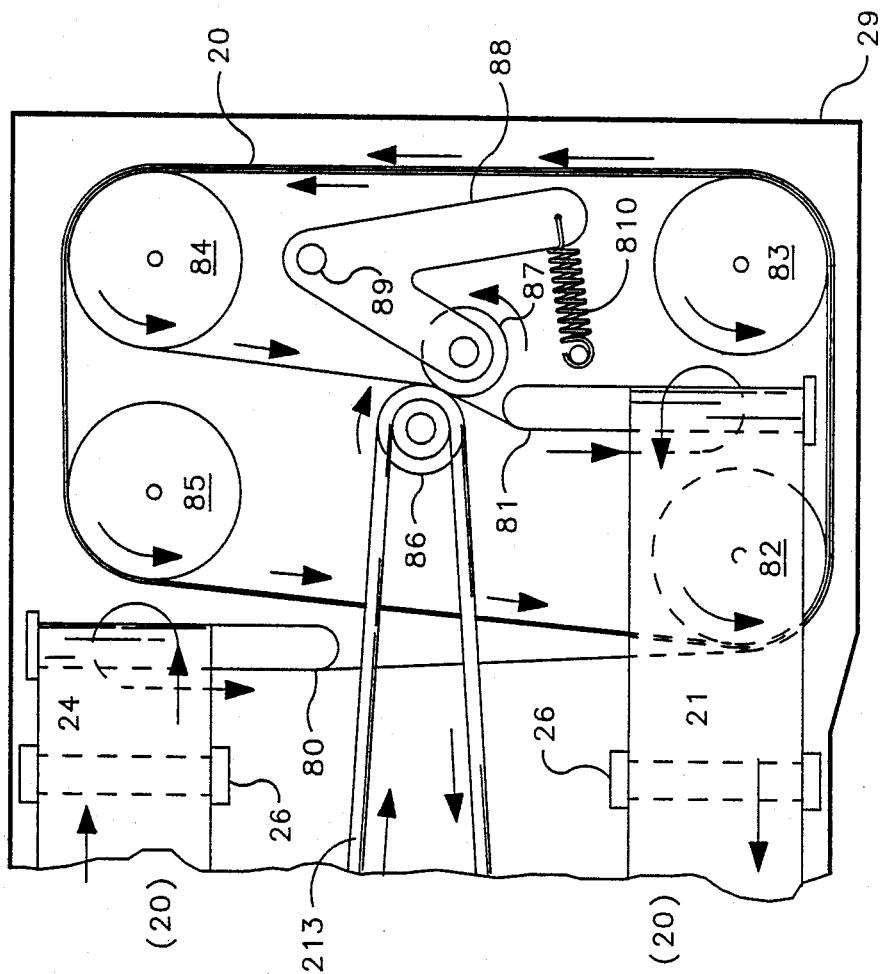
FIG. 8 is a top view with cover removed of one embodiment of the portion of the tape cartridge (denoted as Section C) for feeding and storing the tape media in the tape cartridge. This embodiment utilizes an endless loop of tape.

The section of the tape cartridge which registers the tape with respect to the disc drive heads, and is inserted into the disc drive to gain access to the heads, is shown in FIGS. 2-4 and is referred to as Section A. The section of the tape cartridge used to store and feed the tape is referred to as the feed/storage section. The feed/storage section in a tape cartridge embodiment utilizing a reversing length of tape is shown in FIG. 5 and is referred to as Section B. The feed/storage section in an embodiment utilizing an endless loop of tape is shown in FIG. 8 and is referred to as Section C. Hence, the first tape cartridge embodiment is comprised of Sections A and B, and the second embodiment is comprised of Sections A and C.

In the following discussion, the same reference number will be utilized for the same element shown in more than one figure. The first digit of each reference number will indicate the first figure in which that element is referenced. It will be useful here to introduce some definitions for use in subsequent discussion. The "disc drive head" is the mechanism for reading and/or writing data on an associated data recording medium. The tape typically has a "length", "width", and "thickness" such that its length (typically several feet) is much greater than its width (on the order of ¾ inch), and its width is much greater than its thickness (on the order of 0.0005 inch). Therefore the tape can be viewed as a two dimensional surface extending in the directions of its length and width. "Feeding" a tape shall mean to translate it in the direction of its length. At a given point in the tape, the "plane of the tape" shall mean that plane that is tangent to this two dimensional surface at that point. A "tape guide" shall be any element which modifies the "plane of the tape" or the position of the edge of the tape as the tape feeds over the guide. If a tape guide modifies the plane of the tape such that the tape path is twisted around the tape guide, the tape guide shall be referred to as a "twist tape guide."

The tape media used is nominally 0.75 inches wide. This allows one of the disc drive heads to access 80 tracks, the maximum number used by standard 3.5 inch disc drives. The tape has a magnetic coating with a coercivity and thickness capable of supporting magnetic transitions written by the disc drive head at its normal data rate, at the speed which the tape is traveling. A back coating may be used if it provides benefits (e.g., reduced friction, increase wear resistance and/or reduce static electric charge) to the means for tape feed, storage, or registration. If the tape is stored wrapped upon itself, this back coating must be non-magnetic to avoid print over. As 3.5 inch disc drives implement future increases in linear density due to changes in their head/media systems, the tape media may be changed in a similar manner to the disc media. This will allow the tape media to support identical increases in linear density, which will result in increased capacity and/or performance of the tape cartridge.

Figure 1:
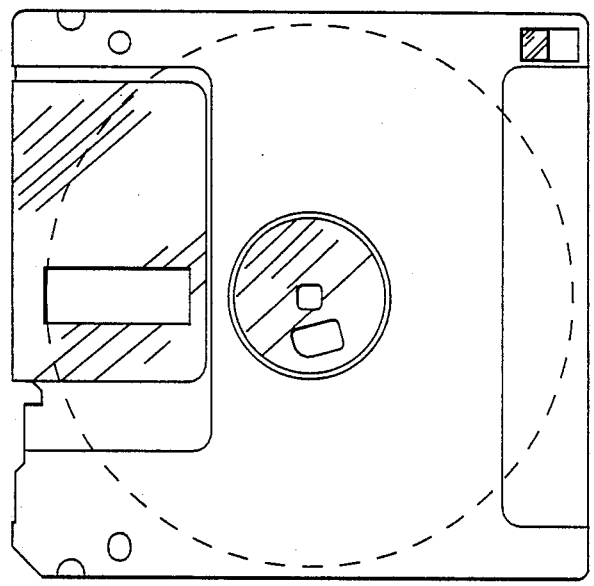
FIG. 1 is a bottom view of a standard 3.5 inch microfloppy disc cassette. This is the current media used to store data in a 3.5 inch microfloppy disc drive.

FIG. 1 is a bottom view of a standard 3.5 inch microfloppy disc cassette. The dashed circle represents the disc media inside the cassette. The hatched area is an autoshutter. This is a protective cover that slides when the disc cassette is inserted into the disc drive, so an opening in the autoshutter is aligned with a matching opening in the cassette, allowing the disc drive heads to access the disc media. The shutter is shown in the open position. The half filled rectangle in the top right corner of the cassette in FIG. 1 is a write protect switch. This switch position is read by a sensor in the disc drive, and allows the disc drive to recognize a write protected disc cassette.

FIGS. 2-4 show Section A of the tape cartridge. Because Section A is intended to fit inside a 3.5 inch microfloppy disc drive, its dimensions must be suitably close to those of a 3.5 inch microfloppy disc cassette (90 mm wide, 94 mm long, and 3.3 mm thick), so that it fits properly with the cassette loading mechanism of the disc drive. In general, this requires that section a have a disclike shape suitable for fitting through the slot in the front of typical disc drives. The tape media 20 enters Section A from the tape supply location 21. Tape is fed from location 21 to twist tape guide 22, past a location L at whcch data is written to or read from the tape by the disc drive head(s) (somewhere along dotted line 25), to twist tape guide 23, and out of Section A to the tape take-up location 24. In general, location L is the location at which reading and writing occur and in some disc drives, such as optical disc drives, may not be adjacent to the read/write head(s).

In embodmments where a finite length of tape is used, such as that depicted as Section B, the tape is fed from supply location 21 to take-up location 24. The supply and take-up then switch positions. This reverses the direction of the tape feed to rewind the tape. Once the tape is rewound, the supply and take-up revert to their original positions and the cycle is repeated. The means of this switching will be outlined in the discussion of Section B.

Twist tape guides 22 and 23 are oriented at nominally 45 degrees to the direction of feed of the tape. At each twist tape guide, the tape wraps substantially 180 degrees around the guide in a helical fashion, which changes the path of feed of the tape by 90 degrees and rotates the normal to the plane of the tape by 180 degrees. This manner of guiding the tape within Section A keeps the tape within a disclike region that has a size and shape that enable Section A to fit through the slot in the front of many typical disc drives. These guides enable the tape to enter section A, gain proper access to location L, and exit section A while remaining within the volume defined by section A. In this manner, the tape passes across the disc drive heads, which are located along line 25, with a motion similar to that of the disc media.

Several other tape guides 26 provide a reference edge which acts to register the tape, and/or provide a wrap angle to change the plane of the tape. These tape guides 26 are in several locations: between tape supply location 21 and twist tape guide 22; between twist tape guides 22 and 23; add between twist tape guide 23 and tape take-up location 24. In instances where tape guide 26 provides a reference edge to register the tape, a force is exerted on the tape to constrain one of its edges to the reference edge of the tape guide 26. This force may be exerted on the tape either by deliberate misalignment of twist tape guides 22 and 23, by the shape of twist tape guides 22, 23, and/or tape guide 26, and/or by a spring loaded surface acting on the non-reference edge of the tape. All of the tape guides and drive elements which contact the tape are fabricated from a nonmagnetic material suc as non-magnetic stainless steel or a ceramic material.

In the embodiments shown, the power to feed the tape is derived from the disc drive spindle motor. As is illustrated in FIG. 4, near the center of section A is a cyclindrical hub 27 containing a circular hole 43 at the center of the hub and a second hole 44 away from the center of the hub. When the tape cattridge is loaded into a 3.5 inch disc drive, hole 43 is located onto the circular shaft of the disc drive spindle motor. As the disc drive spindle motor rotates, a spring loaded pin from the motor hub assembly extends into hole 44. By this means, power from the disc drive spindle motor is transmitted to hub 27 in the tape cartridge. The tape cartridge is enclosed by a protective shell 29. A hole 42 in the lower surface of the protective shell 29 allows the spindle motor hub assembly to access hub 27. Openings 212 in both the upper and lower surfaces of shell 29 provide access to the tape along line 25 by the disc drive heads. These openings 212 are protected by a sliding piece 40 which contains openings 41 in its upper and lower surfaces. During use of the tape cartridge, sliding piece 40 is located such that openings 41 are positioned adjacent to openings 212. This sliding piece is essentially identical in appearance and function to the "auto shutter" on a 3.5 inch microfloppy disc cassette and movement of sliding piece 40 is effected in the same manner as for the auto shutter. A write protect switch 45 operates in a similar manner to the write protect switch of a disc cassette, and interacts identically with the sensor in the disc drive that determines the state of this switch. The protective shell also includes a rotary bearing 28 whose inner race rotates with hub 27 and whose outer race remains fixed, thereby isolating the rotary motion of hub 27 from the stationary part of the tape cartridge.

To ensure that the tape is accurately registered with the read/write heads, it is important that the tape cartridge be reproducibly aligned with some reference frame in the disc drive. In general, registration of the tape requires that the tape be fed past location L with an accurate positioning of the tape and a proper direction of feed of the tape. This is achieved by including within the tape cartridge a set of guide pins to accurately guide the tape within the tape cartridge and including some structure for accurately aligning the tape cartridge with the disc drive (and in particular, with location L). In the bottom of the protective shell of the microfloppy disc cassettes used in 3.5 inch microfloppy disc drives, there is a pair of holes that extend part way through the shell. When the microfloppy disc cassette is loaded into the disc drive, these holes fit over a pair of pins to partially control the vertical location of the disc cassette in the disc drive. These pins are suitable as both vertical and translational reference points in the disc drive for the purpose of aligning the tape cartridge. Therefore, the tape cartridge includes a pair of holes 210 and 211 in the bottom surface of the protective shell 29 that are positioned to fit over the pair of pins in the disc drive unit.

The slot shaped hole 211 provides a light clearance fit over the associated pin in the disc drive. Holes 211 and 43 provide the angular and vertical reference for the tape cartridge. Hole 210 provides a loose clearance fit over the associated pin in the disc drive and provides only vertical reference for the tape cartridge. The remainder of the translational location is determined by the tight clearance fit of hole 43 to the disc drive spindle motor's circular shaft. Two additional pins located inside the disc drive near the disc drive's cassette opening also provide vertical support to either a microfloppy disc cassette or the tape cartridge.

Because the tape cartridge is reproducibly aligned to the disc drive via holes 43, 210, and 211, tape guides 22, 23, and 26 must be accurately positioned with respect to these registration holes. The runout of bearing 28 must also be accounted for in tolerance accumulation to ensure that tape 20 is accurately aligned with the disc drive heads.

In both embodiments shown, the disc drive spindle motor is used as a power source to feed the tape. Hub 27 contains a pulley which drives belt 213. Belt 213 is used to transmit power from hub 27 to the tape driving element in either Section B or Section C. If the disc drive spindle motor has insufficient power or is otherwise unsuitable for driving the tape, either of these embodiments may function in an identical fashion using a dedicated motor contained within the tape cartridge, or some other suitable power source, to drive the tape.

A feed/storage section, denoted as Section B, utilizing a pair of supply/takeup spools 51 and 52 is shown in FIG. 5. One end of the tape media 20 is fixed onto spool 51, and the other is fixed onto spool 52. The tape media is alternately wound from one spool, that serves as a supply spool, through Section A, and onto the other spool, which serves as a take-up spool. In FIG. 5, the tape supply location 21 is on spool 51, while spool 52 is being driven to act as the tape take-up location 24. This is the direction of tape travel in which data is written or read. Currently, standard 3.5 inch disc drive heads are capable of data transfer only when the media is traveling in one direction. Hence the other direction of tape travel is for rewind. If future changes in head design allow for bi-directional data transfer, both directions of tape travel will accomodate data transfer.

In this embodiment, power is derived from the disc drive spindle motor via belt 213. Because the spindle motor turns only in one direction, the direction of tape travel must be reversed by means of a toggling clutch located on a spool shaft 50 on which tape spools 51 and 52 are free to rotate. A sliding pulley 53, which is driven by belt 213, is engaged by means of teeth 60 (as illustrated in greater detail in FIG. 6) with the teeth in either of a pair of helical sliders 54 and 55. Each helical slider is rotatably mounted on shaft 50 and is connected by a torsion spring 63 to an associated one of spools 51 and 52. Through this arrangement, power is transmitted from the disc drive motor to the current take-up spool.

Figure 6:
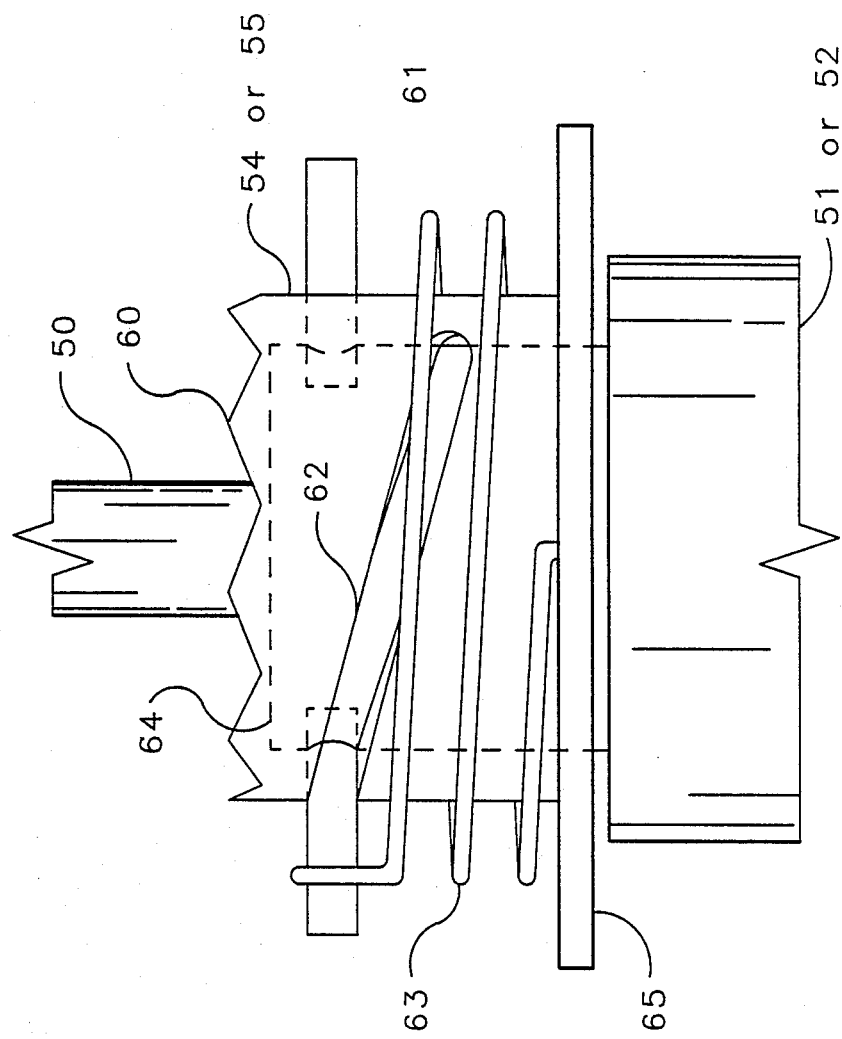
FIG. 6 is a detail view of a helical slider. This is a component of the embodiment shown in FIG. 5.
Figure 7C:
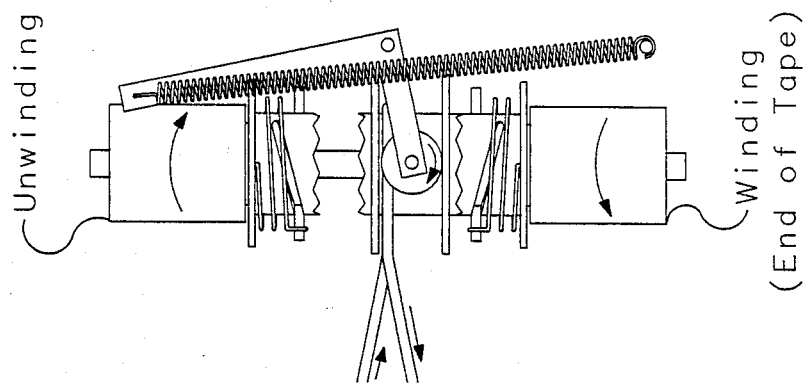
FIGS. 7a-c illustrate the motion of the toggling clutch embodiment shown in FIG. 5. The clutch is activated when one of the spools is unwound to the end of the tape.
Figure 7B:
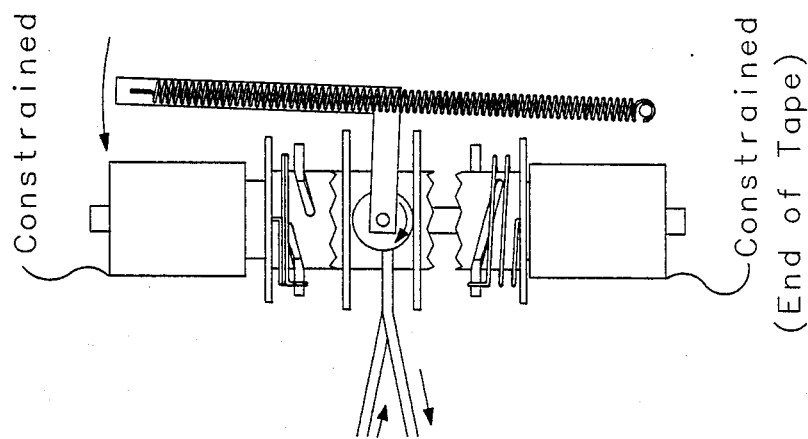
Figure 7A:
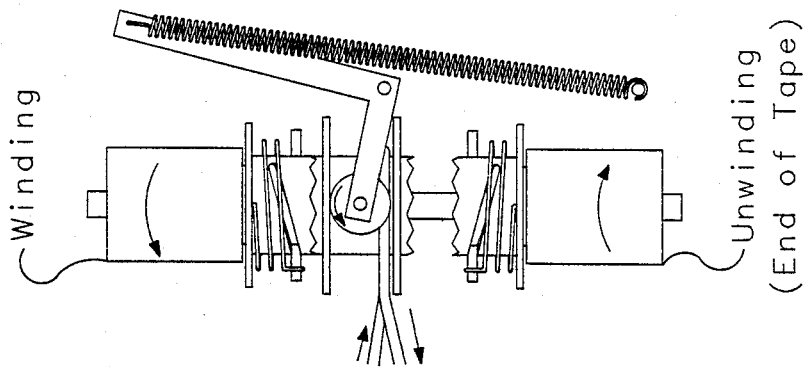

FIG. 6 shows a detail of one of the helical sliders 54 and 55. Each helical slider has a hollow sleeve that can rotate about an extension 64 of its respective spool, 51 or 52. A pair of pins 61 are rigidly attached to extension 64 and pass through a helical slot 62 in the slider. When the tape is fully expended from the supply spool, the attachment of the ends of the tape to the take-up spool and to the supply spool prevents additional feed of the tape, thereby preventing the take-up spool from further rotation. As the driven sliding pulley continues to turn, the helical slider to which it is engaged is forced to rotate about shaft 50. Beacuse shaft 50 is rigidly mounted to shell 211, as the helical slide rotates, it unscrews itself and the sliding pulley away from the take-up spool by groove 62 riding on pins 61. The angle of the teeth is steeper than that of the helical groove, to ensure that the teeth do not disengage preferentially to the helical translation of the pin/groove combination. As the sliding pulley is pushed past center, an over-center device 56 is activated. This over-center device 56 is spring loaded by spring 57, and is coupled to the sliding pulley by roller 58. The over-center device pushes the sliding pulley toward the other spool, which then engages its teeth with the new take-up spool and helical slider. FIGS. 7a–c illustrate this process. This action frees the old helical slider, which is then retracted to the old take-up spool by means of a torsional return spring 63 attached at one end to pin 61 and at the other end to a flange 65 which is part of the helical slider 54 or 55. This tape feed reversing process repeats itself each time the end of the tape is reached.

Figure 9:
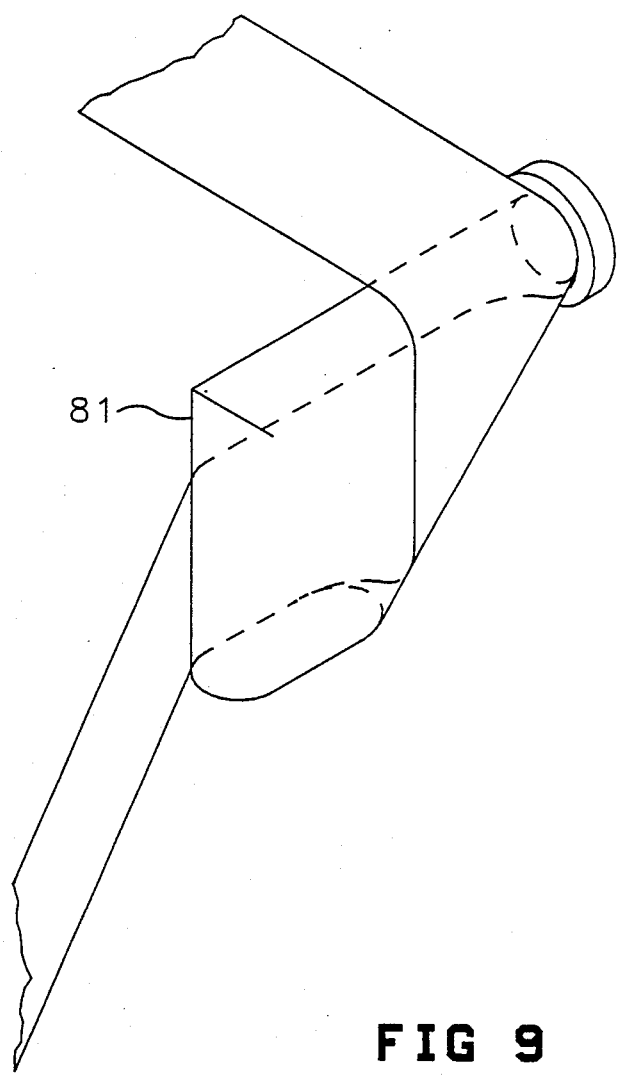
FIG. 9 is a detail view of a tape wrapping around a twist tape guide. This is a component of the emoodiment shown in FIG. 8.

The feed/storage embodiment denoted as Section C is shown in FIG. 8. The tape media 20 enters Section C from Section A at location 24. The tape wraps around twist guide 80 in such a manner as to execute a half twist. Orientation of the tape is changed from nominally co-planar with Section A upon entering the guide, to nominally on its edge, traveling in a nearly transverse direction, as it exits the guide. A looping arrow in FIG. 8 shows this change in direction. Twist guide 81 is identical to 80, however it is oriented to perform the inverse directional change on the tape. FIG. 9 is a detail of these guides. After exiting twist guide 80, the tape feeds on its edge onto the outside of a spool of tape defined by the perimeter of rollers 82–85. As the tape is fed, it continually spirals inward until the inside strand of tape warps more completely around roller 84, and into the center of the spool.

This embodiment shows a capstan 86 deriving power from the disc drive spindle motor via belt 213 wrapped around a pulley fixed to the capstan. An idling pinch roller 87 is supported by idler arm 88. The idler arm pivots about pin 89 such that the pinch roller is loaded against the capstan by spring 810. In this manner a friction drive is provided to feed the tape. From here the tape wraps around twist guide 81, which reorients the tape nominally co-planar with Section A as it exits Section C.

In all endless loop embodiments, the tape travels in one direction only, therefore no reversing clutches are required. This scheme is inherently more time efficient with current 3.5 inch microfloppy disc drives because no time is required to rewind the tape. Due to the extra tape twisting required however, and the friction that may be associated with guiding this twisting, a more powerful motor may be required than in embodiments utilizing a reversing length of tape. Other endless loop embodiments may differ in the relative location of the drive element, the spool hub(s) drive, and the geometry of the tape twisting action. However all of these embodiments are comprised of essentially the same functional elements.

We claim:

1. A tape cartridge, suitable for transferring data between a tape and a disc drive head in a disc drive, said tape cartridge comprising:
    a tape suitable for transferring data between the tape and said disc drive head;
    a protective shell enclosing the tape, a portion of which is configured to interact with said disc drive;
    means for registering a portion of the tape at a location L at which data can be transferred between the tape and the disc drive head;
    means for feeding the tape past location L; and
    means for storing the tape.

2. A tape cartridge as in claim 1 wherein said means for registering comprises:
    means for aligning the tape cartridge with the disc drive when the tape cartridge is loaded into the disc drive; and
    means for guiding the tape within tee tape cartridge such that, when the tape cartridge is aligned with the disc drive, the tape is registered with location L.

3. A tape cartridge as in claim 2 wherein:
said shell has a bottom portion that includes therein at least two holes located such that, when the tape cartridge is loaded into the disc drive, each of the holes fits over an associated peg in the disc drive and aligns the tape cartridge with the disc drive.

4. A tape cartridge as in claim 3, for use with a disc drive having a motor shaft, wherein one of said holes in the bottom portion of the shell is adapted to fit over the motor shaft, whereby the motor shaft functions as one of said disc drive pegs utilized to align the tape cartridge with location L.

5. A tape cartridge as in claim 2 wherein said means for registering includes a section A that is insertable into the disc drive and wherein within section A the tape is contained within a substantially planar region.

6. A tape cartridge as in claim 5 wherein, within section A, the guide means comprises:
    a plurality of twist tape guides;
    said tape wrapping about each of said twist tape guides by substantially 180 degrees to change the direction of feed of the tape and to rotate the normal to the plane of the tape by substantially 180 degrees so that the tape feeds through section A within a disclike region, whereby section A can have a disclike shape suitable for insertion into a disc drive.

7. A tape cartridge as in claim 1 wherein the storage means comprises a means for storing the tape in an endless loop of tape.

8. A tape cartridge as in claim 1 wherein the storage means comprises a first spool and a second spool between which the tape is wound.

9. A tape cartridge as in claim 1 wherein the tape feed means comprises:
    means, in contact with the tape, for driving the tape; and
    a linkage coupling power from a motor to the means for driving the tape.

10. A tape cartridge as in claim 9 wherein the linkage includes a clutch for reversing the direction in which the tape is fed past location L.

11. A tape cartridge as in claim 9, for use with a disc drive having a motor, wherein the linkage is adapted to transfer power from the disc drive motor to the means for driving the tape.

12. A tape cartridge as in claim 9, further comprising a tape cartridge motor, and wherein the motor to which the linkage is coupled is this tape cartridge motor.

13. A tape cartridge as in claim 9 wherein the means for driving comprises a capstan in contact with the tape and connected by the linkage to the motor to provide the power needed to drive the tape.

14. A tape cartridge as in claim 9 wherein the means for driving comprises a first spool and a second spool, said spools being coupled by the linkage to the motor and responsive to motor rotation to wind the tape from one spool to the other, said spools also functioning as the means for storing tape.

* * * * *